(12) United States Patent
Venugopal et al.

(10) Patent No.: US 11,190,436 B2
(45) Date of Patent: Nov. 30, 2021

(54) THREAD NETWORK CONTROL

(71) Applicant: Arm Limited, Cambridge (GB)

(72) Inventors: Deepak Venugopal, Oulu (FI); Anna Katariina Liehu, Oulu (FI); Mika Antero Tervonen, Oulu (FI)

(73) Assignee: ARM LIMITED, Cambridge (GB)

( * ) Notice: Subject to any disclaimer, the term of this patent is extended or adjusted under 35 U.S.C. 154(b) by 117 days.

(21) Appl. No.: 16/269,109

(22) Filed: Feb. 6, 2019

(65) Prior Publication Data

US 2020/0252325 A1 Aug. 6, 2020

(51) Int. Cl.
*H04L 12/751* (2013.01)
*G06F 16/2457* (2019.01)
*H04L 12/773* (2013.01)
*H04W 84/18* (2009.01)

(52) U.S. Cl.
CPC ........ *H04L 45/10* (2013.01); *G06F 16/24578* (2019.01); *H04L 45/60* (2013.01); *H04W 84/18* (2013.01)

(58) Field of Classification Search
CPC ............................ H04L 12/2807; H04L 45/28
USPC .......................................................... 709/223
See application file for complete search history.

(56) References Cited

U.S. PATENT DOCUMENTS

| | | | |
|---|---|---|---|
| 2004/0228490 A1* | 11/2004 | Klemba | H04L 63/104 380/270 |
| 2013/0268542 A1* | 10/2013 | Dinwoodie | H04L 45/748 707/748 |
| 2017/0222877 A1* | 8/2017 | Sagot | H04W 40/24 |
| 2020/0252326 A1 | 8/2020 | Venugopal et al. | |

* cited by examiner

*Primary Examiner* — Moustafa M Meky
*Assistant Examiner* — Sm Z Islam
(74) *Attorney, Agent, or Firm* — Patterson Thuente Pedersen, P.A.

(57) ABSTRACT

Provided is a machine-implemented method of operating a device, comprising entering the device into a membership relation with a first self-organizing subnet at a first rank in a hierarchy of subnets of the network; receiving at the device a message from a second device making known parameters of a second subnet at a second rank in the hierarchy of subnets of the network; and responsive to receipt of the message, sending a message from the first device making known parameters of the first subnet at the first rank to the second device to render the subnet at the second rank operable to merge with the subnet at the first rank.

18 Claims, 11 Drawing Sheets

Method 1000

THREAD NETWORK CONTROL

The present technology is directed to the control of devices that are operable in electronic communication with further devices within self-assembling network and subnet environments, such as Thread network partitions, and more particularly to the control of device interactions leading to the merging of Thread network partitions.

Implementations of the present technology are operable in many network environments that support mesh (any-to-any connectivity) operations, exemplified by, but not limited to, Thread networks. Thread networks are dynamically created mesh networks that rely on intelligence programmed into individual devices to build working connectivity over wider ranges than would be available, for example, using the wireless connectivity of an individual device.

Thread network devices comprise routers and end devices, connected in such a manner as to enable multi-hop communications as an approach to overcoming connectivity limitations, such as wireless network range limitations. Thread network end devices typically incorporate processing capabilities that are operable to perform normal data processing workloads, and some of these end devices are also capable of becoming routers—these are known as Router-Eligible End Devices (REEDs). Some routers may be operable as Border Routers, which allow the Thread networks to establish external connections to the Internet.

Devices in Thread networks are operable to build partitions—that is, dynamically self-assembling subnets that coalesce round a leader. A leader generates numerical partition information comprising a partition ID and a partition weighting—this numerical partition information determines a hierarchical ranking of each partition relative to other partitions. Devices operable in Thread environments are pre-programmed to follow certain rules in joining partitions, in becoming routers if they are eligible and in becoming leaders; after joining a partition, further rules are acted upon such that a device repeatedly attempts (until successful) to merge to a detected partition of a higher rank when it detects an advertisement message containing partition information as described above from the higher-ranking partition. Each leader periodically transmits advertisement messages to attract partitions of lower rank. Thus, a higher-ranking Thread network partition is designed to attract lower-ranked partitions to itself (by advertising itself) until all devices have merged into the highest ranking partition. This dynamic process of expansion may take a significant time to extend connectivity across a collection of devices, and it is vulnerable to interruption and restart during that time. The time it takes to develop a Thread network in this "organic growth" model, and the vulnerability of the network to breakage and reestablishment, are difficulties faced in adoption of the Thread network approach.

As will be clear to one of ordinary skill in the art, it is also necessary to set the periodicity of advertisement messages to a reasonable limit, so that bandwidth available for the normal workload-related transmissions in the network is subject to as little interference as possible from the advertisement messages. Thus, the need to send the advertisement messages to increase the connectivity of the network is traded off against the need to preserve bandwidth for "real work" to be done by the network.

The operation of Thread networks according to the published Thread specification is sufficiently well known to those of ordinary skill in the computing art to need no further detailed description, except insofar as is necessary to illustrate the details of the presently-disclosed technology.

In a first approach to the many difficulties encountered in managing the efficient merging of subnets, such as partitions of nodes in Thread networks, the present technology provides a machine-implemented method of operating a device, comprising entering the device into a membership relation with a first self-organizing subnet at a first rank in a hierarchy of subnets of the network; receiving at the device a message from a second device making known parameters of a second subnet at a second rank in the hierarchy of subnets of the network; and responsive to receipt of the message, sending a message from the first device making known parameters of the first subnet at the first rank to the second device to render the subnet at the second rank operable to merge with the subnet at the first rank.

In a hardware approach, there is provided electronic apparatus comprising logic elements operable to implement the methods of the present technology. In another approach, the computer-implemented method may be realised in the form of a computer program product, tangibly stored in a non-transient storage medium, and operable in use to cause a computer system to perform the process of the present technology.

In the context of a Thread network architecture, entering the device into a membership relation with a self-organizing subnet comprises attaching the device to a Thread partition of a mesh network, and the action of making known parameters of a subnet comprises operating according to an advertising protocol of a Thread partition. In the same context, the hierarchy of subnets may be formed from at least a first rank and a second rank, where a subnet at the first rank comprises a leader device having higher-ranking partition information than a leader of a subnet at the second rank. The hierarchy of subnets may be formed from at least a first rank and a second rank, where a subnet at the first rank has a preponderance of member devices over a subnet at the second rank.

Implementations of the disclosed technology will now be described, by way of example only, with reference to the accompanying drawings, in which.

A Thread network partition is a connected group of nodes that operate independently of any other nodes in the network, and is formed at the instigation of a leader chosen according to a randomly-issued partition identifier. A partition has a position in a hierarchy of partitions, based on a ranking schema. If multiple partitions are formed, all devices will eventually join the highest-ranked partition. When a new device joins the network, it becomes a REED in that network. If the Thread algorithm determines that the network needs more routers, REEDs will become routers to improve the routing connectivity of the network.

Routers send advertisements periodically to form and maintain the links between routers and form a mesh network by attracting lower-ranking nodes. The ranking of each partition is determined by a combination of the partition ID and the weighting value for the Thread network partition. Given a choice between two or more Thread network partitions, a node will attach itself to the one with the maximum weighting value. If two or more Thread network partitions share the maximum weighting value, a node will join the one with the highest numerical partition ID value. REEDs will also advertise their partitions, but at a very slow rate. In either case, the aim of sending the advertisement messages is to attract lower-ranking entities to join the sending partition.

Advertisement messages follow a fixed protocol, as defined in the Thread specification, such that all compatible devices can construct and interpret advertisement messages correctly, so as to derive from them the information necessary to evaluate the relative rankings of the participants in an interchange of messages. All devices in a partition share the same partition id and weight that is generated by the Leader and given to the devices when joining the partition.

During Thread network formation, several partitions may be initially formed. Eventually it is expected that these partitions will merge into a single highest-ranking partition. When all the devices have joined a single highest-ranking partition, every node within the partition can be reached by every other node. This means that full connectivity is achieved among nodes and the network is stable. The faster the devices merge into a single partition, the sooner the connectivity among all devices is established. The process of reaching this connected state typically takes several "rounds" of periodical advertisement messages, as will now be described in the worked examples of FIGS. 1 to 5.

Figure 1:
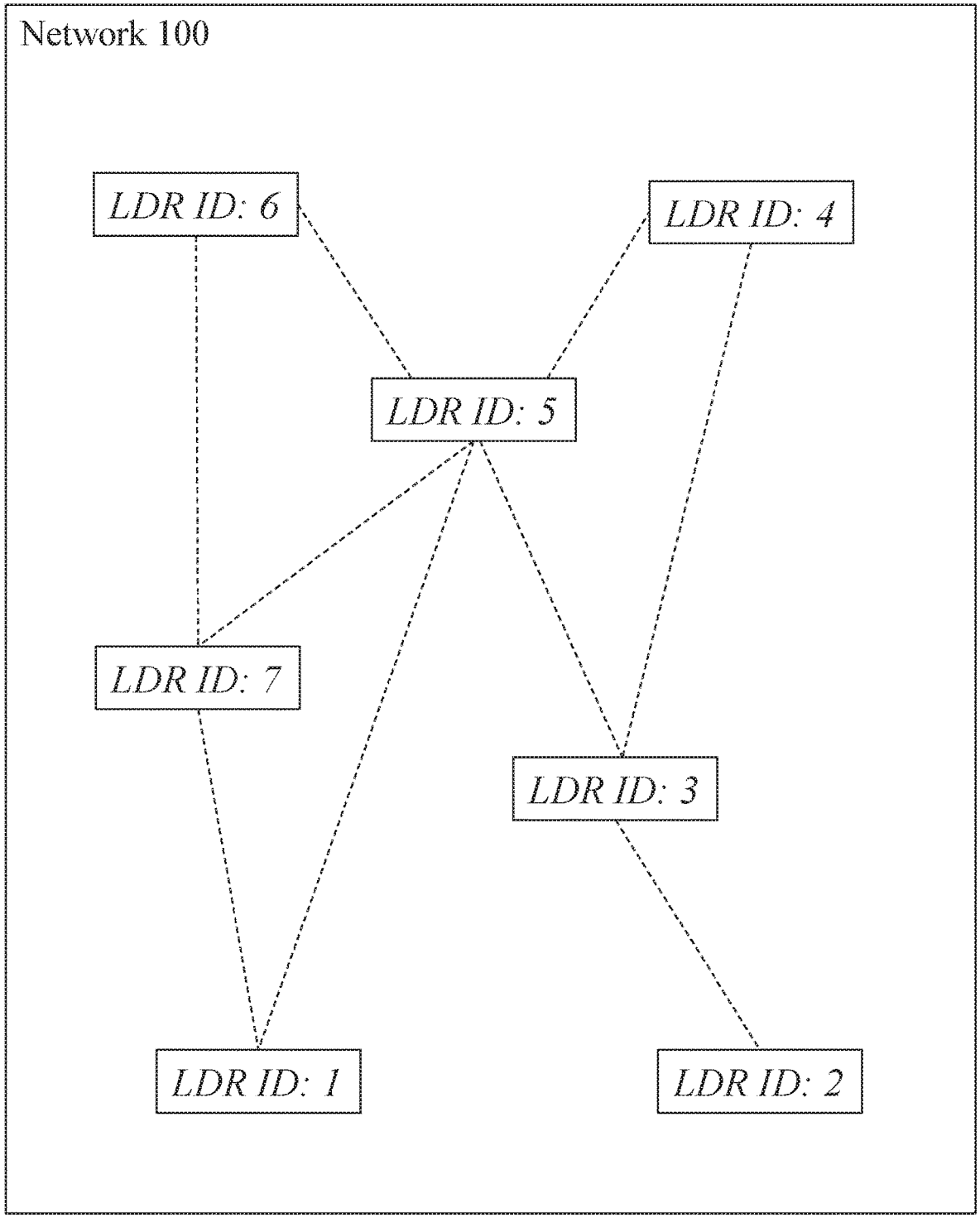
FIG. 1 shows one exemplary state of a set of nodes prior to the formation of a Thread network partition.

The exemplary operation of partition formation in a Thread network is shown starting at FIG. 1, in which each node (LDR ID:1 to LDR ID:7) is initialized as a potential leader of a partition identified by the appended ID value. For example, LDR ID:1 is a potential leader device in partition ID:1. Each leader device sends advertisement messages after forming its own partition. The dotted lines in the figure show that the devices are not yet connected, but that each device can hear the advertisement messages sent by the device or devices connected to it by a dotted line. The advertisement messages cannot all be successful (though each consumes some bandwidth that would otherwise be available for normal workload-related transmissions)—some advertisements will not be heard by any lower-ranking entity, and some will fail for other reasons. For example, if a potential parent device that has advertised itself in the round of advertisement messages is shortly thereafter itself in the process of becoming a child, an attempt to join it by a lower-ranking device may fail.

Figure 2:
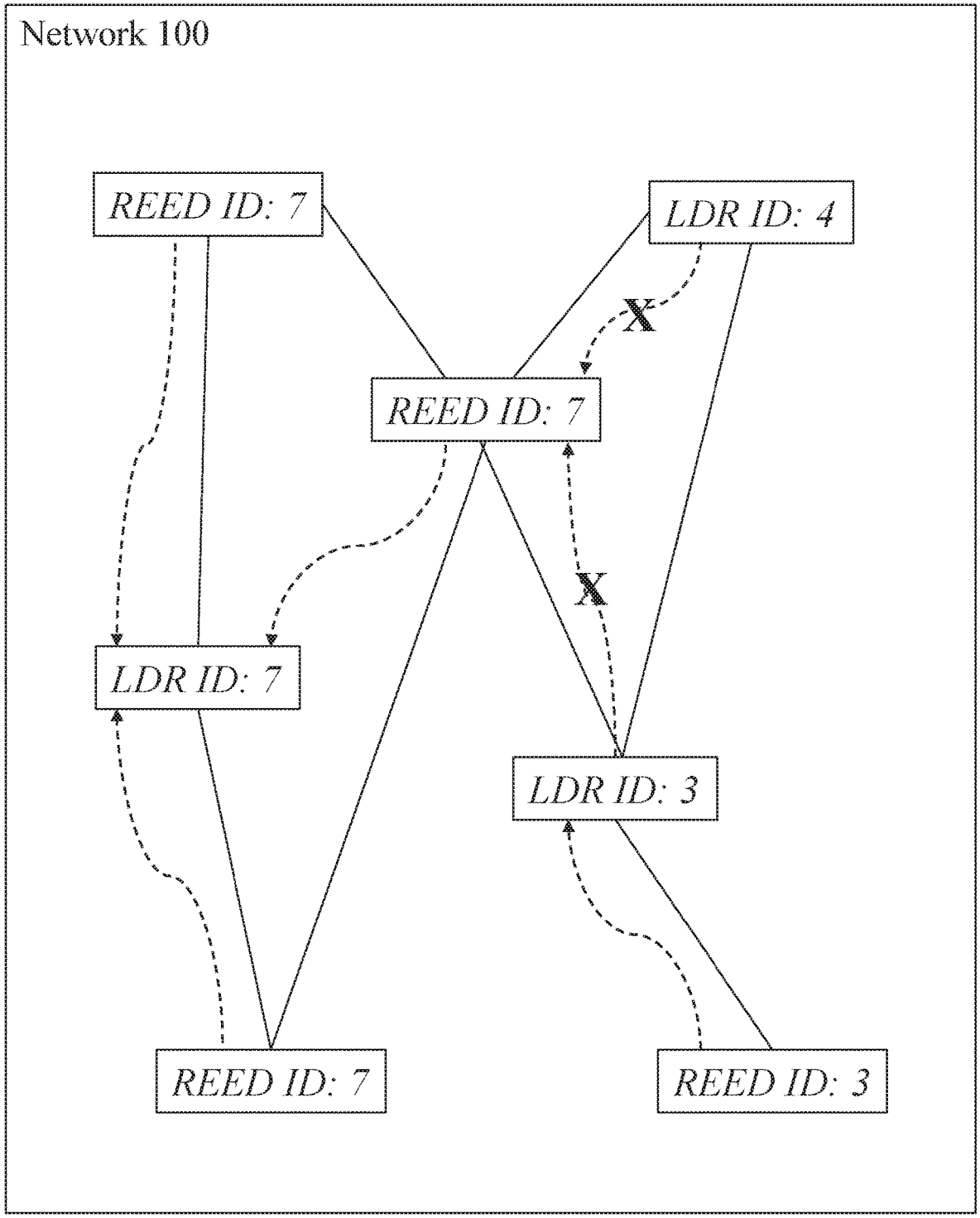
FIGS. 2-5 show further exemplary states of a set of nodes during the formation of a Thread network partition.

In FIG. 2, the devices have heard the first round of advertisements from neighbouring devices, and each device attempts to attach itself as a REED to the highest-ranking available partition. The former LDR devices with IDs 1, 5 and 6 are successful in attaching as REEDs to parent LDR ID:7, and former LDR ID:2 is successful in attaching to parent LDR ID:3, but some attachment attempts fail because the targeted parent is in a transitional state. Thus, the attempts by former LDRs with IDs 3 and 4 to attach to parent ID:5 fail.

Figure 3:
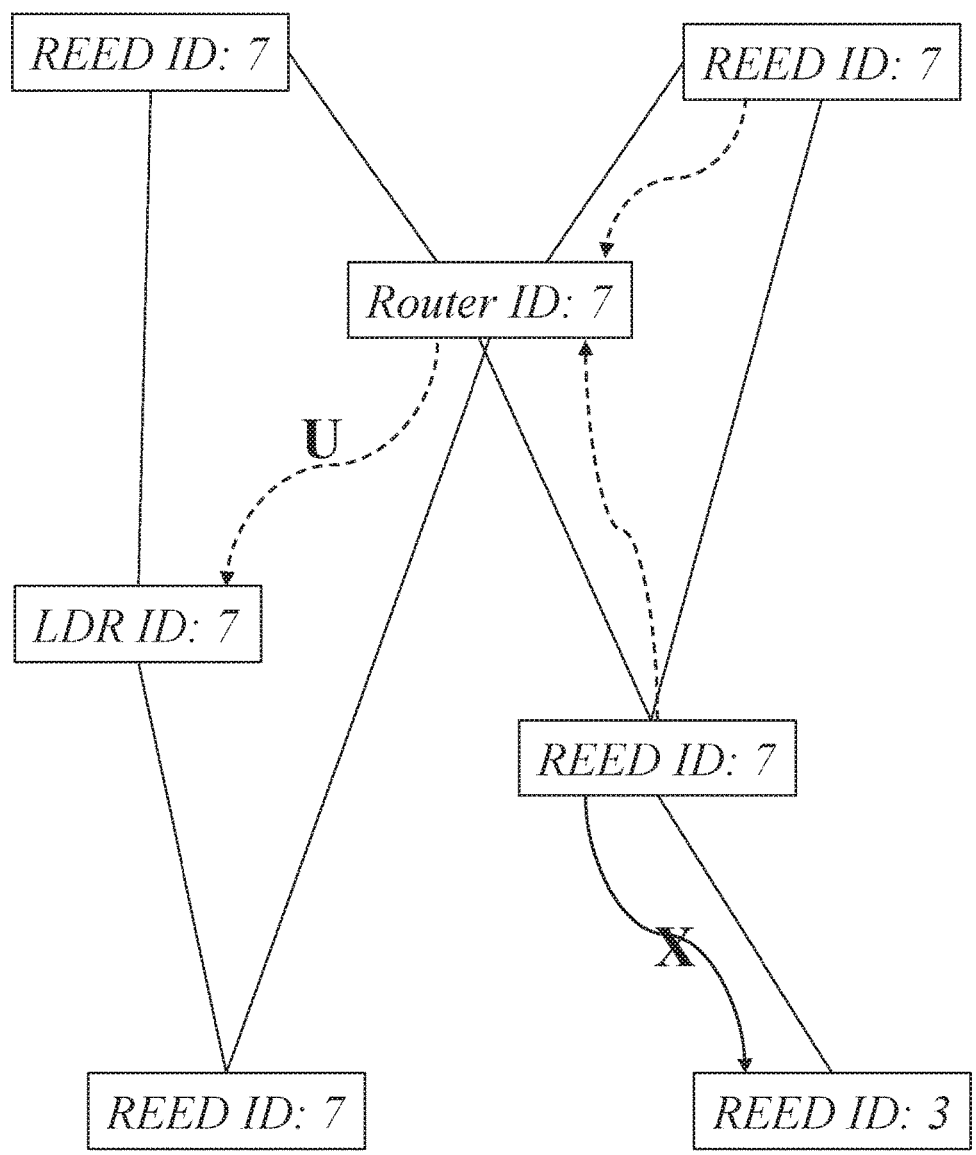

After a time, as shown in FIG. 3, a second round of advertisements causes lower-ranking entities to attempt to join higher-ranking partitions. At the same time, REEDs in the higher-ranked partition become routers when lower-ranked entities attempt to join the partition through them—this occurs with the REED that was previously LDR ID:5, which becomes a router (Router ID:7) when REED that was previously LDR ID:3 and the REED that was previously LDR ID:4 join the partition that has formed around leader LDR ID:7. When the REED (LDR ID:3) can no longer act as parent to the REED (LDR ID:2), the parent-child relationship is lost.

Figure 4:
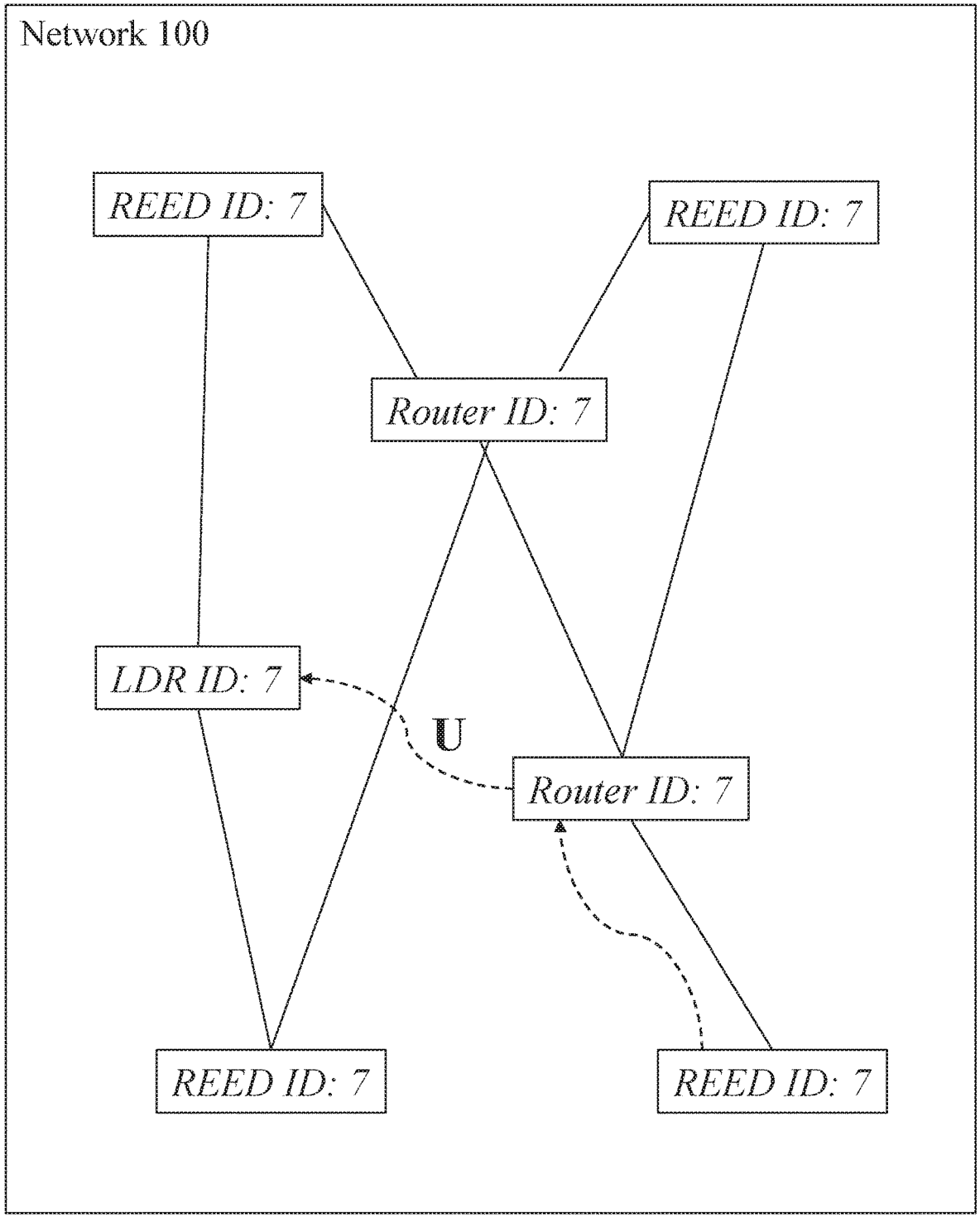

In FIG. 4, in a third round, the REED that was previously LDR ID:3 upgrades to a router and the REED that was previously LDR ID:2 attaches as a REED. The Leader Routers and REEDs now all have ID:7 as participants in partition ID:7.

Figure 5:
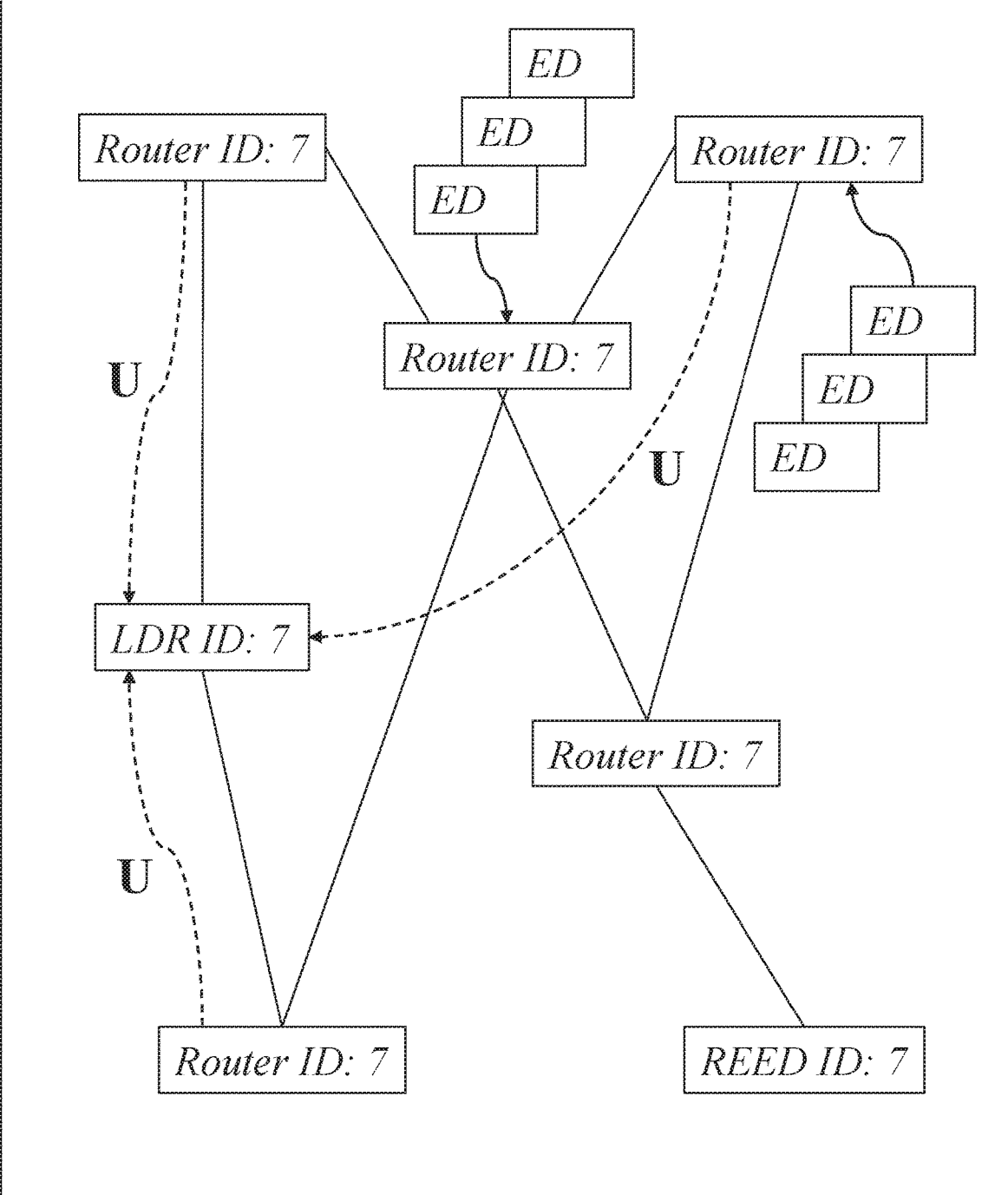

In FIG. 5, in a fourth round, the network partition stabilizes, with REEDs that were formerly LDR ID:1, LDR ID:4 and LDR ID:6 upgrading to routers to offer improved routing, and end devices ED attached to their closest available parent.

The above example shows the gradual organic process by which the establishment of a stable Thread network partition is achieved. In this very small and simple example, it has taken four rounds of advertisement messages to reach a stable state of connectivity. In reality, networks are typically larger and more complex and thus many more rounds may be necessary, each round set to a periodicity that allows for the minimum possible interference with normal workload-related message transmission over the network.

Figure 6:
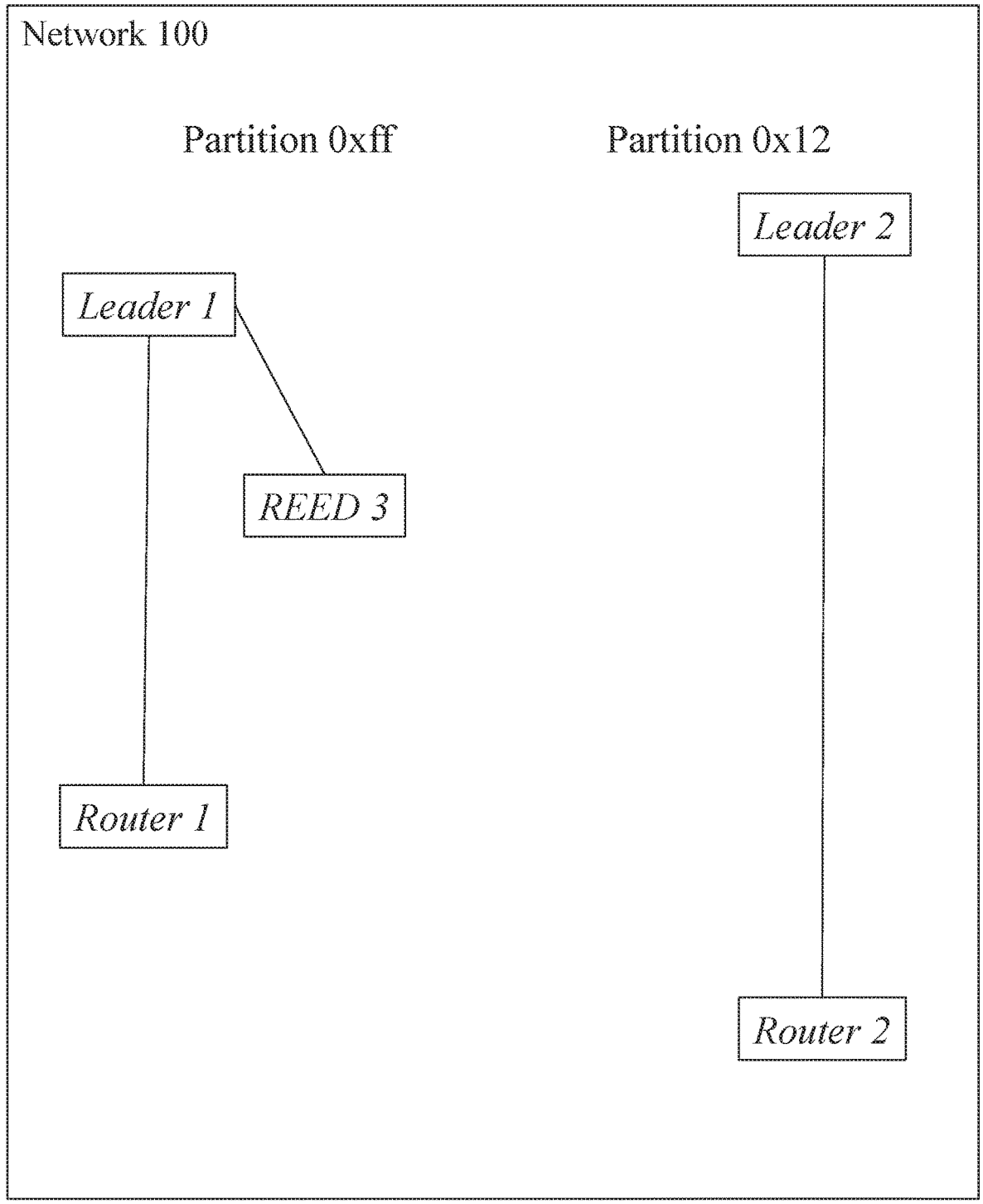
FIGS. 6-9 show exemplary states of a set of nodes during the formation of a Thread network partition according to an implementation of the present technology.

A further worked example of the formation of a Thread network comprising Thread network partitions is shown in FIGS. 6 to 9. In FIG. 6, two partitions are shown in network 100: partition 0xff and partition 0x12, where 0xff is numerically shown as higher-ranking than 0x12. In FIG. 6, responsive to an advertisement message in a first round, REED 3 has just joined partition 0xff. On joining, REED 3 sends its first advertisement message, constituting a second round. However, no entity in lower-ranking partition 0x12 is close enough in the network to hear the advertisement message from REED 3, and so the two partitions remain separate.

It will be clear to one of ordinary skill in the art that network 100 as shown in the figure is much simpler than a typical real-world network, and that real-world networks are likely to comprise many more nodes and partitions than are shown here. It will also be clear that the benefits of the present technology are not limited to Thread networks, but may extend to many other forms of network in which any form of subnet merging may be operable.

Figure 7:
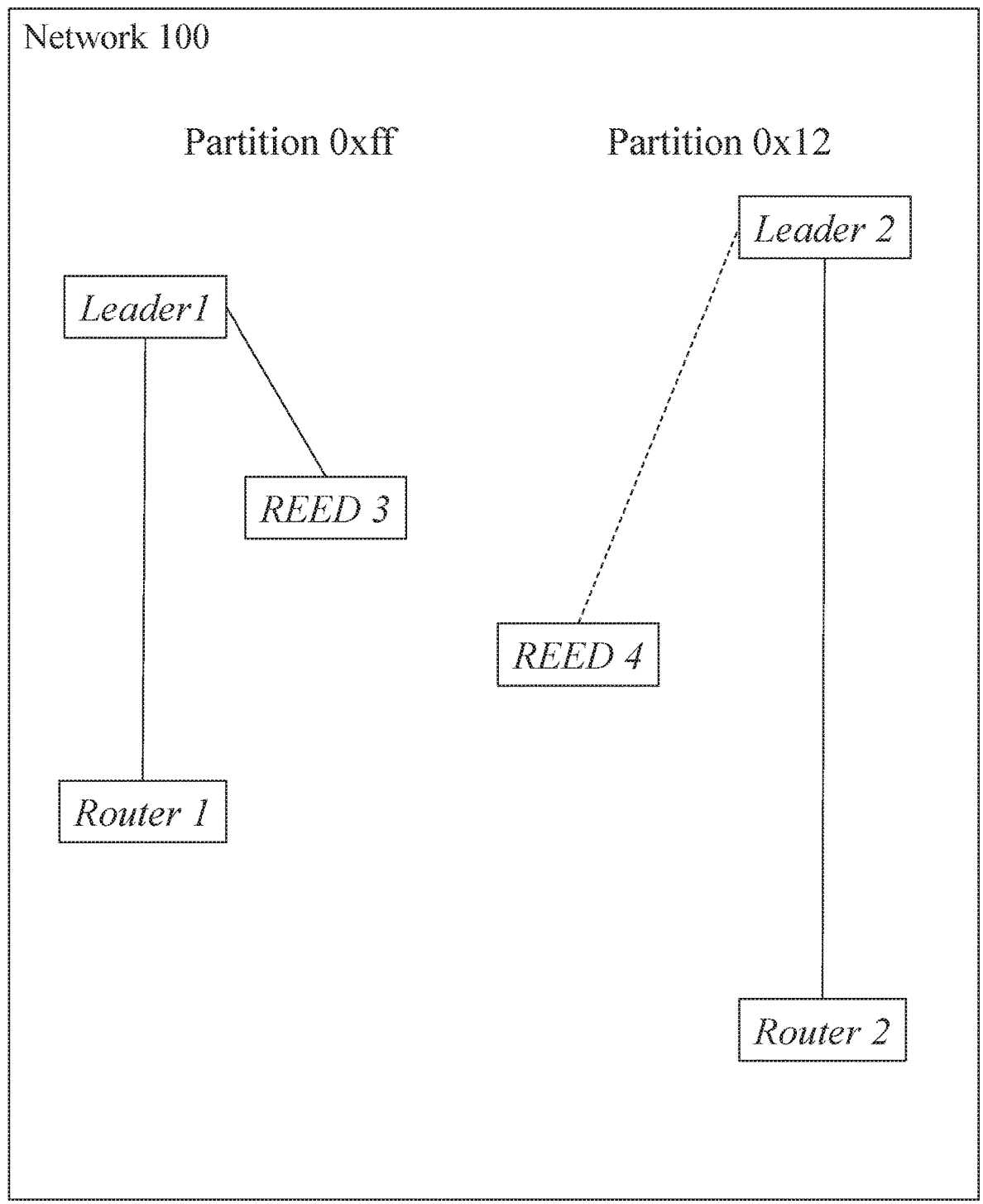

In FIG. 7, REED 4 responds to an advertisement message from Leader 2 and joins partition 0x12 (as shown by the dotted line). REED 4 attaches to Leader 2 because it prefers a Router over REED 3 as per Thread parent selection rules. During the attachment process of REED 4, REED 3 does not have knowledge of REED 4's attachment to a lower ranking partition. On joining, REED 4 sends an advertisement message. The advertisement message from REED 4 is heard by REED 3 because it is close enough in network 100. However, because the partition to which REED 4 belongs (partition 0x12) is lower-ranking than the partition to which REED 3 belongs (0xff), REED 3 does not react, and the partitions must therefore remain disjoint at the REED 3/REED 4 boundary for at least another round of advertisement messages.

The presently-disclosed technology addresses this extra round of delay by providing for the triggering of an additional advertisement (or a periodic sequence of advertisement messages) from a device in a higher-ranking partition when it hears an advertisement message from a device in a lower-ranking partition. In an implementation, the additional advertisement follows the conventional REED advertisement format.

In a further refinement, the sending of additional advertisement messages may be controlled by configuration parameters to limit the numbers of advertisement messages permitted in network 100 at any time, so as to minimise the impact of the advertisement messages on the real workload bandwidth available in network 100. With the additional advertisement from the higher-ranking partition and the response of the lower-ranking partition, faster merging and thus faster achievement of connectivity among the devices in network 100 may be attained. This is because the device in the lower-ranking partition that has advertised itself and been heard by a higher-ranking device will immediately receive the responsive additional advertisement message from the higher-ranking partition that enables it to merge into the higher-ranking partition and then itself start to send advertisements that can be heard by other devices. This faster process eventually causes the merging of all devices in network 100 into the highest partition with fewer rounds of periodical advertisement messages being used. The faster merging of the partitions means that availability of connectivity between all devices in network 100 occurs sooner.

Figure 8:
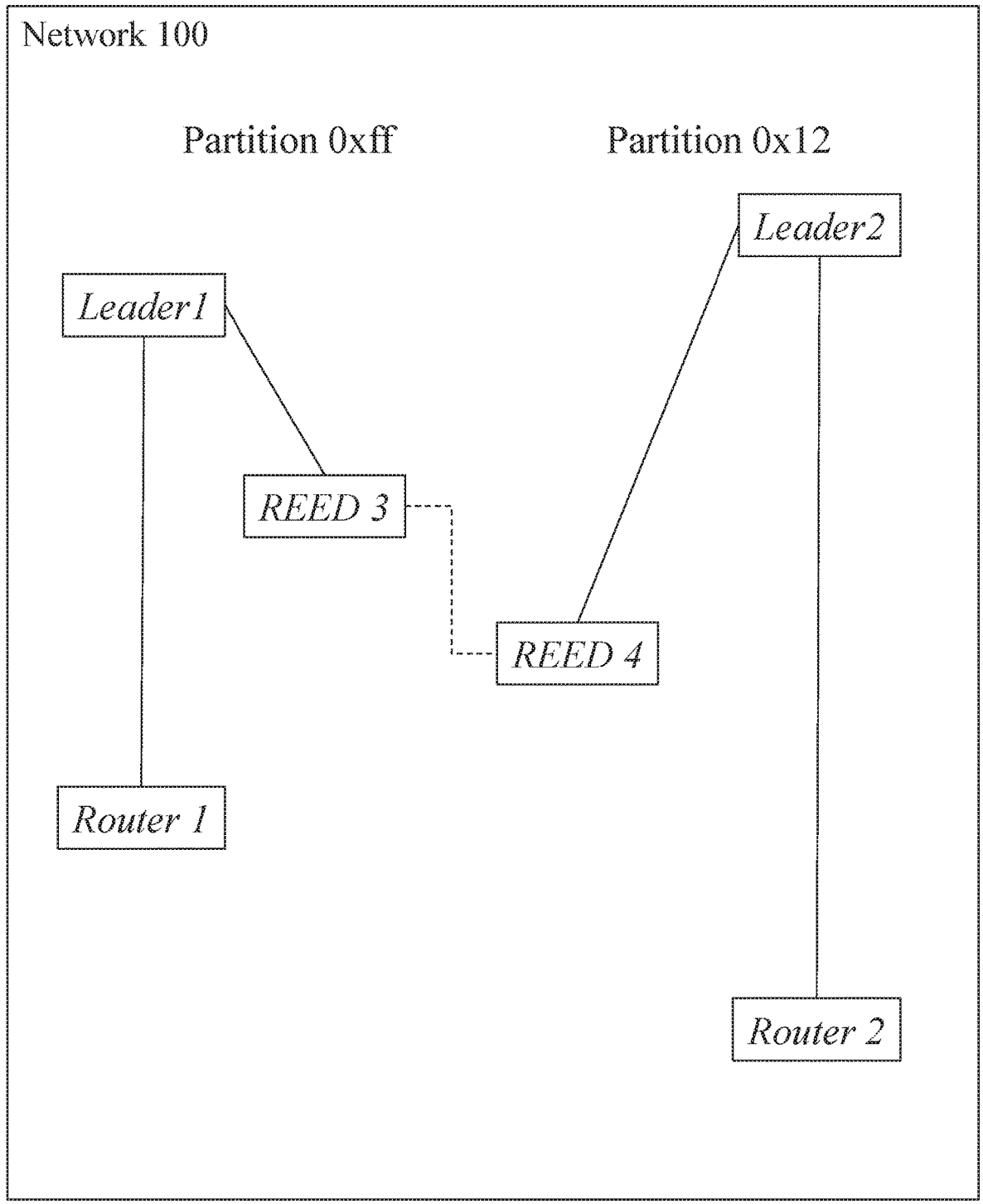
Figure 9:
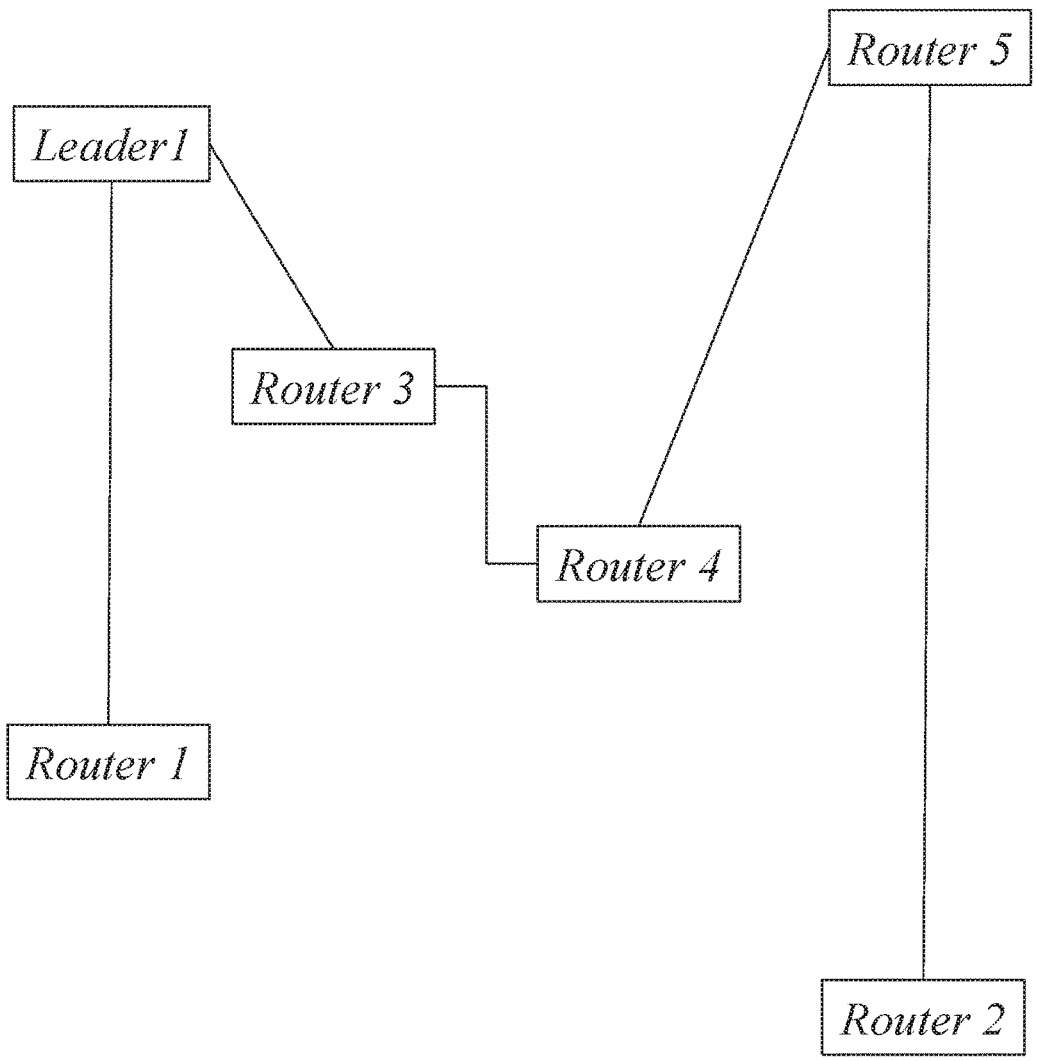

In FIGS. 8 and 9, the improved operation of network 100 is shown according to the present technology, whereby network formation time is reduced from normal REED advertisement delay of up to 10 minutes to a few seconds. In FIG. 8, the process according to FIG. 7 operates in a fundamentally different manner.

As in FIG. 7, REED 4 has responded to an advertisement message from Leader 2 and has joined partition 0x12. On joining, REED 4 sends an advertisement message. The advertisement message from REED 4 is heard by REED 3 because it is close enough in network 100. According to the present technology, REED 3 reacts to receipt of the advertisement message from REED 4, advertising on behalf of lower-ranking partition 0x12, by transmitting an additional (not scheduled) advertisement message on behalf of its partition (0xff). When the additional advertisement message is received by REED 4 at partition 0x12 from the higher-ranking partition 0xff, REED 4 initiates a merge by attaching to REED 3 (shown by the dotted line) and thus joining partition 0xff.

In FIG. 9, the final step of the process is shown. As REED 4 joins partition 0xff, it triggers the remaining nodes in its previous, lower-ranking partition to follow it in joining the higher-ranking partition 0xff. As a result, as shown in the figure, lower-ranking partition 0x12 has ceased to exist, and all the nodes of network 100 are now members of partition 0xff. Following the normal Thread network rules, REED 3, REED 4, and Leader 2 are promoted to routers (respectively Router 3, Router 4 and Router 5) to improve the routing connectivity of the network. Promotion to router follows the normal upgrading rules of the Thread network. Network 100 has now reached a stable state for the time being, wherein all nodes in the network have cross-network connectivity.

Figure 10:
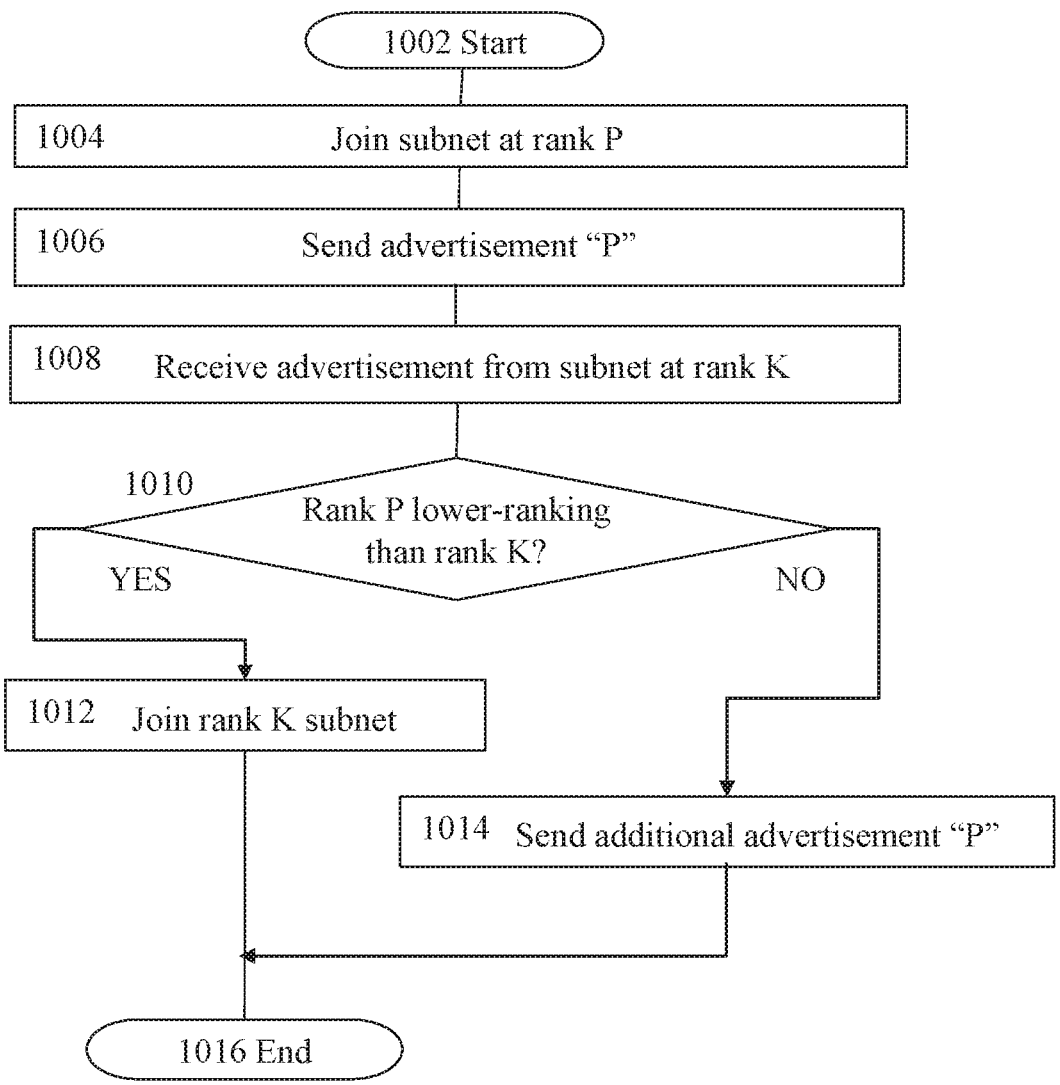
FIG. 10 shows a method of operation of an electronic apparatus to control the formation of a Thread network partition according to an implementation of the present technology.

Turning now to FIG. 10, there is shown a method of operation of an electronic apparatus to control the formation of a Thread network partition according to an implementation of the present technology. The method starts at Start 1002 and at 1004, a device joins a subnet (in our example, a Thread partition) at rank P of a hierarchy of rankings. Following the normal rules for Thread partitions, the device sends its first advertisement message, giving its partition information, such as its partition ID and weighting value according to its rank, in this case "P".

For simplification of the description here, it is assumed that the advertisement message sent at 1006 is unheard and that no responsive action is taken by any device in the network. At 1008, the device hears an advertisement message from a device in a subnet of rank K. At 1010, a test is performed to determine the relative positions of ranks P and K in the network hierarchy. If it is determined at test step 1010 that rank P is lower in the hierarchy than rank K, the device obeys the conventional rules and joins the rank K subnet at 1012. The process then ends at End 1016. If it is determined at test step 1010 that rank P is not lower in the hierarchy than rank K, the device immediately responds at 1014 by sending an additional advertisement message (not a normally-scheduled message) giving its partition information, such as its partition ID and weighting value according to its rank, in this case "P". In this manner, in a Thread implementation, the lower-ranking Thread partition's advertisement is heard and acted upon by the higher-ranking partition, thus shortening the process by which the partitions merge to achieve full network-wide connectivity. The process completes at End 1016.

Figure 11:
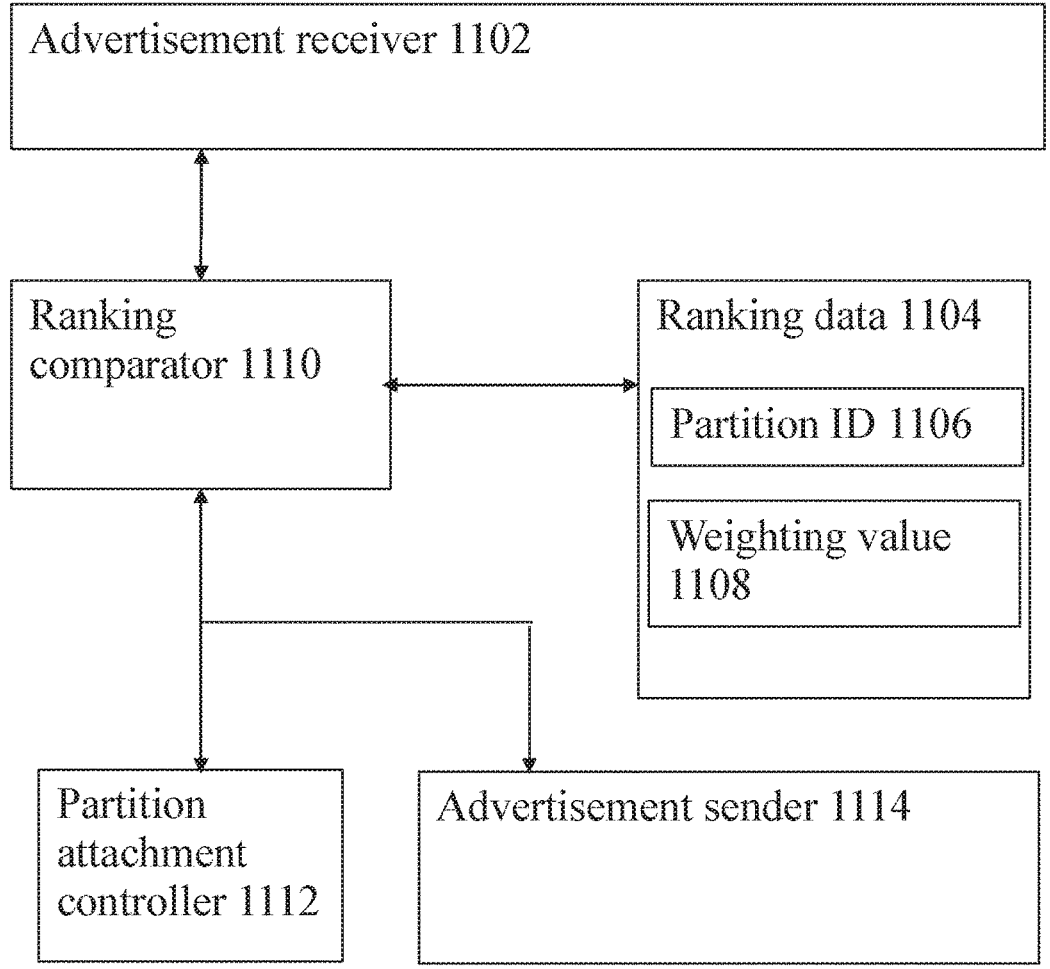
FIG. 11 shows a block diagram of an arrangement of logic, firmware or software components, or any combination thereof, by means of which the presently described technology may be implemented.

In one implementation, an arrangement of logic, firmware or software components, or any combination thereof, may embody the presently described technology, as shown in FIG. 11. In FIG. 11, components 1100 comprise advertisement receiver 1102, operable to receive advertisement messages containing partition information comprising partition IDs and weighting value information relating to the subnet or partition that sent the advertisement message. Components 1100 further comprise storage containing ranking data 1104 for the receiving device, comprising partition ID 1106 and weighting value information 1108. Ranking comparator 1110 is operable to compare ranking data 1104 with ranking data derived from the advertisement received by advertisement receiver 1102 to determine the relative rankings as input to partition attachment controller 1112 or to advertisement sender 1114.

In this way, the present technology provides a machine-implemented method of operating a device, comprising entering the device into a membership relation with a first self-organizing subnet at a first rank in a hierarchy of subnets of the network; receiving at the device a message from a second device making known parameters of a second subnet at a second rank in the hierarchy of subnets of the network; and responsive to receipt of the message, sending a message from the first device making known parameters of the first subnet at the first rank to the second device to render the subnet at the second rank operable to merge with the subnet at the first rank.

In the exemplary Thread network architecture, entering the device into a membership relation with a self-organizing subnet comprises attaching the device to a Thread partition of a mesh network, and the action of making known parameters of a subnet comprises operating according to an advertising protocol of a Thread partition. In the same context, the hierarchy of subnets may be formed from at least a first rank and a second rank, where a subnet at the first rank comprises a leader device having an earlier network joining time than a leader of a subnet at the second rank. The hierarchy of subnets may be formed from at least a first rank and a second rank, where a subnet at the first rank has a preponderance of member devices over a subnet at the second rank.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product tangibly embodied in a non-transient computer readable medium having computer readable program code embodied thereon. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method for operating a device in a network of devices, comprising:
   entering a first said device into a membership relation with a first self-organizing subnet at a first subnet rank in a hierarchy of subnets of said network;
   receiving at said first said device an advertisement message from a second said device making known parameters of a second subnet at a second subnet rank in said hierarchy of subnets of said network; and
   responsive to receipt of said advertisement message, sending a further advertisement message from said first said device making known parameters of said first self-organizing subnet at said first subnet rank to said second said device to render said subnet at said second subnet rank operable to merge with said subnet at said first subnet rank.

2. The machine-implemented method according to claim 1, said entering said first said device into a membership relation with said first self-organizing subnet comprising attaching said device to a Thread partition of a mesh network.

3. The machine-implemented method according to claim 1, said second said device making known parameters of said second subnet comprising operating according to an advertising protocol of a Thread partition.

4. The machine-implemented method according to claim 1, said making known parameters of said first self-organizing subnet at said first subnet rank comprising operating according to an advertising protocol of a Thread partition.

5. The machine-implemented method according to claim 1, said hierarchy of subnets being formed from at least a first subnet rank and a second subnet rank, where a subnet at said first subnet rank comprises a leader device having higher-ranking partition information than a leader of a subnet at said second subnet rank.

6. The machine-implemented method according to claim 1, said hierarchy of subnets being formed from at least a first subnet rank and a second subnet rank, where a subnet at said first subnet rank has a preponderance of member devices over a subnet at said second subnet rank.

7. An electronic device in a network of devices comprising electronic logic components to:
   enter said device into a membership relation with a first self-organizing subnet at a first subnet rank in a hierarchy of subnets of said network;
   receive an advertisement message from a second device making known parameters of a second subnet at a second subnet rank in said hierarchy of subnets of said network; and
   responsive to receipt of said advertisement message, send a further advertisement message making known parameters of said first self-organizing subnet at said first subnet rank to said second device to render said subnet at said second subnet rank operable to merge with said subnet at said first subnet rank.

8. The electronic device according to claim 7, said electronic logic components to enter said device into a membership relation with said first self-organizing subnet comprising electronic logic components to attach said device to a Thread partition of a mesh network.

9. The electronic device according to claim 7, said second device electronic logic components to make known parameters of said second subnet comprising electronic logic components to operate according to an advertising protocol of a Thread partition.

10. The electronic device according to claim 7, said electronic logic components to make known parameters of said subnet at said first subnet rank comprising electronic logic components to operate according to an advertising protocol of a Thread partition.

11. The electronic device according to claim 7, said hierarchy of subnets being formed from at least a first subnet rank and a second subnet rank, where a subnet at said first subnet rank comprises a leader device having higher-ranking partition information than a leader of a subnet at said second subnet rank.

12. The electronic device according to claim 7, said hierarchy of subnets being formed from at least a first subnet rank and a second subnet rank, where a subnet at said first subnet rank has a preponderance of member devices over a subnet at said second subnet rank.

13. A computer program product tangibly embodied in a non-transitory computer readable medium having computer readable program code embodied thereon, said computer readable program code being operable, when loaded into a computer and executed thereon, to cause said computer to:
  enter into a membership relation with a first self-organizing subnet at a first subnet rank in a hierarchy of subnets of said network;
  receive an advertisement message from a device making known parameters of a second subnet at a second subnet rank in said hierarchy of subnets of said network; and
  responsive to receipt of said advertisement message, send a further advertisement message making known parameters of said first self-organizing subnet at said first subnet rank to said second device to render said subnet at said second subnet rank operable to merge with said subnet at said first subnet rank.

14. The computer program product according to claim 13, said entering said computer into a membership relation with said first self-organizing subnet comprising attaching said device to a Thread partition of a mesh network.

15. The computer program product according to claim 13, said device making known parameters of said second subnet at said second subnet rank comprising operating according to an advertising protocol of a Thread partition.

16. The computer program product according to claim 13, said making known parameters of said first self-organizing subnet at said first subnet rank comprising operating according to an advertising protocol of a Thread partition.

17. The computer program product according to claim 13, said hierarchy of subnets being formed from at least a first subnet rank and a second subnet rank, where a subnet at said first subnet rank comprises a leader device having higher-ranking partition information than a leader of a subnet at said second subnet rank.

18. The computer program product according to claim 13, said hierarchy of subnets being formed from at least a first subnet rank and a second subnet rank, where a subnet at said first subnet rank has a preponderance of member devices over a subnet at said second subnet rank.

* * * * *